(12) United States Patent
Beck et al.

(10) Patent No.: US 9,729,603 B2
(45) Date of Patent: Aug. 8, 2017

(54) CONTENT STREAM DELIVERY USING VARIABLE CACHE REPLACEMENT GRANULARITY

(71) Applicants: Andre Beck, Batavia, IL (US); Jairo O. Esteban, Freehold, NJ (US); Steven A. Benno, Towaco, NJ (US); Volker F. Hilt, Middletown, NJ (US); Ivica Rimac, Remseck (DE); Yang Guo, Princeton Junction, NJ (US)

(72) Inventors: Andre Beck, Batavia, IL (US); Jairo O. Esteban, Freehold, NJ (US); Steven A. Benno, Towaco, NJ (US); Volker F. Hilt, Middletown, NJ (US); Ivica Rimac, Remseck (DE); Yang Guo, Princeton Junction, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 789 days.

(21) Appl. No.: 13/628,563

(22) Filed: Sep. 27, 2012

(65) Prior Publication Data

US 2014/0089452 A1 Mar. 27, 2014

(51) Int. Cl.
*G06F 15/16* (2006.01)
*H04L 29/08* (2006.01)
*H04N 21/845* (2011.01)
*H04L 29/06* (2006.01)

(52) U.S. Cl.
CPC .......... *H04L 67/02* (2013.01); *H04L 67/2842* (2013.01); *H04L 67/42* (2013.01); *H04N 21/8456* (2013.01)

(58) Field of Classification Search
CPC ..... H04L 67/02; H04L 67/42; H04L 67/2842; H04N 21/8456
USPC .......................................... 709/219, 224, 213
See application file for complete search history.

(56) References Cited

U.S. PATENT DOCUMENTS

| | | | |
|---|---|---|---|
| 5,787,472 A * | 7/1998 | Dan et al. ..................... 711/134 |
| 6,377,972 B1 * | 4/2002 | Guo et al. ..................... 709/201 |
| 6,463,508 B1 * | 10/2002 | Wolf et al. ..................... 711/133 |
| 6,952,712 B2 * | 10/2005 | Yoshimura et al. .......... 709/201 |
| 7,975,282 B2 * | 7/2011 | Deshpande et al. ............ 725/93 |
| 2002/0029282 A1 * | 3/2002 | Buddhikot et al. ........... 709/231 |
| 2010/0040341 A1 * | 2/2010 | Yeh, Jr. ............................ 386/52 |
| 2010/0146005 A1 * | 6/2010 | Wang et al. .................. 707/797 |

(Continued)

*Primary Examiner* — Bryan Lee
*Assistant Examiner* — Oluwatosin Gidado
(74) *Attorney, Agent, or Firm* — Ryan, Mason & Lewis, LLP (57) ABSTRACT

A method comprises associating at least one cache replacement granularity value with a given one of a plurality of content streams comprising a number of segments, receiving a request for a given segment of the given content stream in a network element, identifying a given portion of the given content stream which contains the given segment, updating a value corresponding to the given portion of the given content stream, and determining whether to store the given portion of the given content stream in a memory of the network element based at least in part on the updated value corresponding to the given portion. The at least one cache replacement granularity value represents a given number of segments, the given content stream being separable into one or more portions based at least in part on the at least one cache replacement granularity value.

19 Claims, 5 Drawing Sheets

(56) References Cited

U.S. PATENT DOCUMENTS

| | | | |
|---|---|---|---|
| 2010/0169302 A1* | 7/2010 | Lopes | G06F 12/0804 707/713 |
| 2010/0180043 A1* | 7/2010 | Lau et al. | 709/231 |
| 2013/0054728 A1* | 2/2013 | Amir et al. | 709/213 |
| 2013/0150015 A1* | 6/2013 | Valk et al. | 455/418 |
| 2013/0191511 A1* | 7/2013 | Liu et al. | 709/219 |
| 2013/0238740 A1* | 9/2013 | Vass et al. | 709/213 |
| 2013/0318300 A1* | 11/2013 | Agrawal et al. | 711/118 |

* cited by examiner

CONTENT STREAM DELIVERY USING VARIABLE CACHE REPLACEMENT GRANULARITY

RELATED APPLICATION

The present application is related to the patent application identified by Ser. No. 13/628,522, titled "Content Stream Delivery Using Pre-Loaded Segment," filed concurrently herewith, the disclosure of which is incorporated by reference herein.

FIELD

The field relates generally to content delivery and, more particularly, to techniques for streaming content.

BACKGROUND

Today, there is a growing demand for content delivery over various networks and network types. End users or content consumers may desire access to various types of content, including video and audio streams. The bandwidth available to the end users, however, may vary greatly depending on a geographical location of a particular end user, network connection type, network load, etc. As such, content streams such as video and audio streams are often available in a number of quality levels. End users can manually choose to receive a given content stream in a specific quality level, or may choose to let the specific quality level be determined based on current network characteristics or bandwidth allotment.

Typically, end users will request content at the best available quality level based on the current network characteristics. The network characteristics for a given end user, however, may vary greatly during delivery of the content stream. For example, an end user may initially have a large amount of bandwidth available and select a high quality level for a content stream. Seconds or minutes later however, the bandwidth available may be significantly lower, and thus the high quality content stream may be interrupted for buffering during delivery of the content stream. To solve this problem, adaptive streaming techniques have been developed which allow for delivery of a content stream in a plurality of quality levels. As network characteristics change during delivery of the content stream, the quality level delivered to an end user will change dynamically to ensure smooth and uninterrupted delivery of the content stream.

Hypertext Transfer Protocol (HTTP) Adaptive Streaming (HAS) is one such adaptive streaming technique. HAS solutions can encode a given content stream such as a video stream in several different quality levels. Each quality level is split into small chunks or segments. Each chunk or segment is typically a few seconds in length. Corresponding audio streams may also be divided into separate chunks.

SUMMARY

Embodiments of the invention provide techniques for streaming content in a network.

For example, in one embodiment, a method comprises associating at least one cache replacement granularity value with a given one of a plurality of content streams comprising a number of segments, receiving a request for a given segment of the given content stream in a network element, identifying a given portion of the given content stream which contains the given segment, updating a value corresponding to the given portion of the given content stream, and determining whether to store the given portion of the given content stream in a memory of the network element based at least in part on the updated value corresponding to the given portion. The at least one cache replacement granularity value represents a given number of segments, the given content stream being separable into one or more portions based at least in part on the at least one cache replacement granularity value.

In another embodiment, a network element comprises a memory and a processor coupled to the memory. The processor is operative to associate at least one cache replacement granularity value with a given one of a plurality of content streams comprising a number of segments, receive a request for a given segment of the given content stream from a given one of a plurality of clients, identify a given portion of the given content stream which contains the given segment, update a value corresponding to the given portion of the given content stream, and determine whether to store the given portion of the given content stream in the memory based at least in part on the updated value corresponding to the given portion. The at least one cache replacement granularity value represents a given number of segments, the given content stream being separable into one or more portions based at least in part on the at least one cache replacement granularity value.

In another embodiment, a system comprises a plurality of clients, at least one server and at least one network element. The at least one network element comprises a memory. The at least one network element is configured to associate at least one cache replacement granularity value with a given one of a plurality of content streams comprising a number of segments, receive a request for a given segment of the given content stream from a given one of the plurality of clients, identify a given portion of the given content stream which contains the given segment, update a value corresponding to the given portion of the given content stream, determine whether to store the given portion of the given content stream in the memory based at least in part on the updated value corresponding to the given portion, and retrieve the given portion of the given content stream from the at least one server. The at least one cache replacement granularity value represents a given number of segments, the given content stream being separable into one or more portions based at least in part on the at least one cache replacement granularity value.

Advantageously, illustrative embodiments of the invention allow for efficient storage and caching in content streaming systems.

These and other objects, features and advantages of the present invention will become apparent from the following detailed description of illustrative embodiments thereof, which is to be read in connection with the accompanying drawings.

DETAILED DESCRIPTION

Embodiments of the invention will be described below in the context of illustrative apparatus, methods and systems. However, it is to be understood that embodiments of the invention are not limited to the specific apparatus, methods and systems described herein, but are more generally applicable to any apparatus, methods and systems wherein it is desirable to improve content streaming.

Embodiments of the invention are described below in the context of HAS systems. It is important to note, however, that embodiments of the invention are not limited solely to use in HAS systems, but instead are more generally applicable to various content streaming systems.

The terms "segment" and "chunk" as used herein refer to independent objects of a content stream. These terms are used interchangeably herein, and are intended to be construed broadly. The term "portion" as used herein refers to a group of independent objects of a content stream. In addition, while various embodiments may be described below referring to a caching proxy, embodiments of the invention are not limited solely to use with caching proxies. Instead, any suitable network element or elements, such as content distribution nodes, surrogate nodes, servers, etc. may be used.

Figure 1:
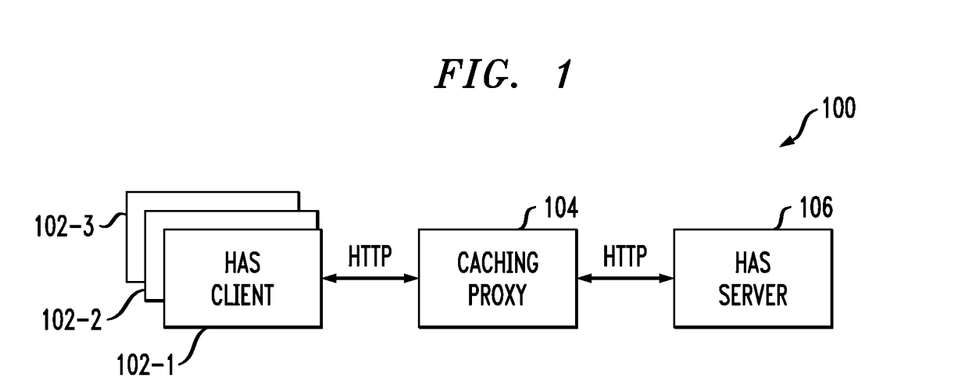
FIG. 1 illustrates a streaming content system, according to an embodiment of the invention.

FIG. 1 shows an example of a content streaming system 100. A plurality of HAS clients 102-1, 102-2 and 102-3 interact with a caching proxy 104, which in turn interacts with an HAS server 106. In the content streaming system 100, the HAS clients 102-1, 102-2 and 102-3, the caching proxy 104 and the system 106 interact by exchanging HTTP commands. It is to be understood, however, that embodiments of the invention are not limited solely to the system 100 shown in FIG. 1. For example, the number of HAS clients 102 may vary. In addition, HAS clients may interact with more than one caching proxy. In some embodiments, the HAS clients do not interact with a caching proxy, but may instead interact with other network elements which interact with content servers. A given caching proxy may also be configured to interact with a number of HAS servers. In other embodiments, each HAS server may have one or more associated caching proxies or network elements which interact with HAS clients or other end users. One skilled in the art will readily appreciate that various other arrangements are possible.

In HAS solutions, each content stream is encoded in several different quality levels and the content stream is split for each quality level into small chunks or segments. HAS streaming is designed so that standard HTTP caching proxies can cache individual chunks or segments. However, the sheer number of chunks or segments leads to various issues, including a significant increase in the number of cache replacement operations compared to content streams consisting of single files, increased use of memory and CPU resources in order to maintain chunk-specific statistics related to the caching proxy's cache replacement algorithm, and suboptimal cache replacement decisions due to the cache replacement algorithm not being aware of the relationship between chunks. In an HAS content stream, each content chunk or segment is an individual and self-contained HTTP object, and thus the inter-relation of chunks is application context transparent to intermediary nodes such as caching proxies.

Embodiments of the invention overcome the above-noted drawbacks by using techniques and algorithms which make cache replacement decisions at a given granularity where cache replacement granularity defines the basic caching and replacement data unit. The cache replacement granularity can be as small as a few chunks or as large as an entire quality level or an entire content stream. Once a cache replacement granularity has been selected, the cache will cache or evict groups of chunks at the chosen cache replacement granularity. As will be described in further detail below, the cache replacement granularity value may be dynamically adjusted. In addition, different cache replacement granularity values can be selected for different content streams. For example, a given quality level of a content stream may comprise 180 chunks or segments. A cache replacement granularity value may be set to 60 sequential chunks or segments, such that the given quality level of the content stream is separated into three groups ([0,60], [61, 120] and [121,180]). A caching proxy or other network element which receives requests for chunks of the content stream will decide whether to add, remove or maintain a particular group of 60 chunks in the cache as a group instead of as individual chunks.

The cache replacement granularity is independent of the algorithm that determines which objects should be cached or replaced. As such, cache replacement algorithms such as Least Recently Used (LRU) or Least Frequently Used (LFU) can be utilized while making cache replacements at different granularities. As the cache only sees requests for individual chunks or segments, which as discussed above are individual and self-contained objects, requests for chunks may be mapped to a group of chunks of the chosen cache replacement granularity value. In the example above of a content stream with 180 chunks and cache replacement granularity value of 60 such that the content stream is split into three groups, a request for chunk 10 is mapped to the first group [0,60]. A value corresponding to this first group is then updated. As described below, the value may be a counter value, a timestamp, a size-normalized utility value, etc. Thus, the algorithm may treat a request for a single chunk as though the entire group of chunks has been requested or account for the fact that the requested chunk only represents a certain fraction of the selected cache replacement granularity by applying a weighting factor as will be described in detail below.

The cache replacement granularity value itself can be a cache configuration parameter or it can be automatically adjusted based on request patterns seen by the cache, remaining cache storage, and other factors.

Figure 2:
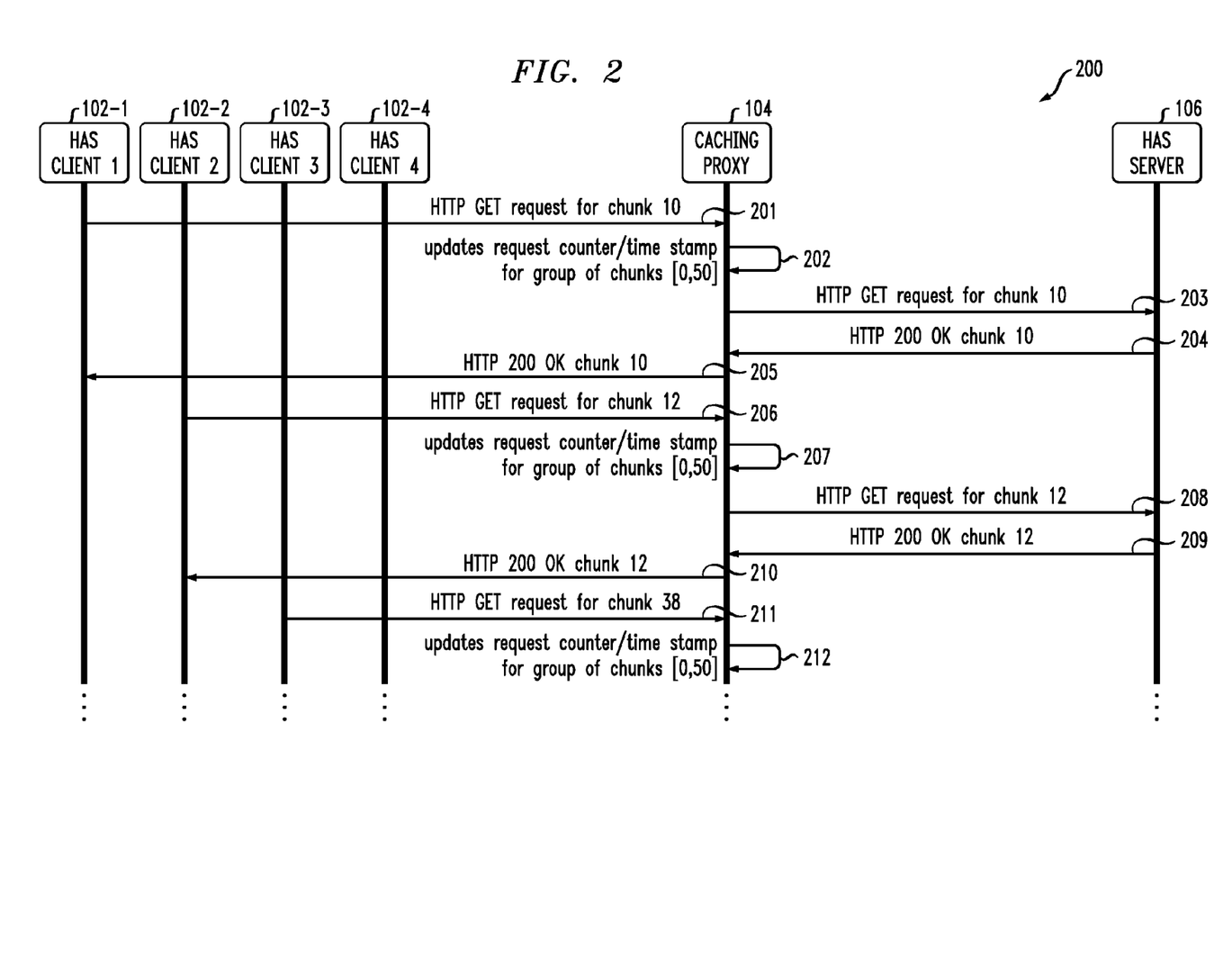
FIG. 2 illustrates a methodology for streaming content, according to an embodiment of the invention.

FIG. 2 illustrates a methodology 200 for streaming content with improved caching efficiency. A given content stream X may be divided into a number of chunks (i.e., x, x+1, x+2, ..., x+N) for each of a plurality of quality levels. For example, the given content stream X may have 200 chunks, which may be subdivided in four groups ([0,50], [51,100], [101,150] and [151,200]). In step 201, HAS client 102-1 sends an HTTP GET request for chunk 10 to caching proxy 104. The caching proxy 104 then updates 202 a request counter/time stamp for the group of chunks [0,50]. The caching proxy may then determine if chunk 10 is already cached. If chunk 10 is not already cached, the caching proxy 104 sends 203 an HTTP GET request for chunk 10 to HAS server 106. In response, the HAS server 106 sends 204 an HTTP 200 OK message including chunk 10 to caching proxy 104. The caching proxy 104 then sends 205 an HTTP OK message including chunk 10 to HAS client 102-1.

In step 206, HAS client 102-2 sends an HTTP GET request for chunk 12 to caching proxy 104. The caching proxy 104 then updates 207 the request counter/time stamp for the group of chunks [0,50]. Again, the caching proxy 104 may determine if chunk 12 is already cached. If chunk 12 is not already cached, the caching proxy 104 sends 208 an HTTP GET request for chunk 12 to HAS server 106. In response, the HAS server sends 209 an HTTP 200 OK message including chunk 12 to caching proxy 104. The caching proxy 104 then sends 210 an HTTP 200 OK message including chunk 12 to HAS client 102-2.

In step 211, HAS client 102-3 sends an HTTP GET request for chunk 38 to caching proxy 104. The caching proxy 104 then updates 212 the request counter/time stamp for the group of chunk [0,50]. The caching proxy 104 then sends 213 an HTTP GET request for chunk 38 to HAS server 106. In response the HAS server 106 sends 214 an HTTP 200 OK message including chunk 38 to caching proxy 104. Caching proxy 104 then sends 215 an HTTP 200 OK message including chunk 38 to HAS client 102-3.

The caching proxy 104 may decide 216 to cache the group of chunks [0,50] based on the request counter/time stamp associated with the group of chunks [0,50]. After a certain number of requests are received for chunks in a given group, the caching proxy 104 can make a determination that storing the entire given group of chunks will increase performance. The caching proxy 104 may require a certain number of requests within a certain time interval. The caching proxy 104 may also compare the request counter/time stamp associated with the given group of chunks and the request counters/time stamps associated with other groups of chunks in making the decision to cache the given group of chunks. In step 217, the caching proxy 104 sends an HTTP GET requests for chunks 0 through 50 to HAS server 106. In response, the HAS server 106 sends 218 HTTP 200 OK messages including chunks 0 through 50 to caching proxy 104.

In step 219, HAS client 102-4 sends an HTTP GET request for chunk 29 to caching proxy 104. The caching proxy 104 then updates 220 the request counter/time stamp for the group of chunks [0,50]. The caching proxy 104 then sends 221 an HTTP 200 OK message including chunk 29 to the HAS client 102-4. Advantageously, the chunk 29 in group [0,50] is already cached, thus improving caching efficiency.

Figure 3:
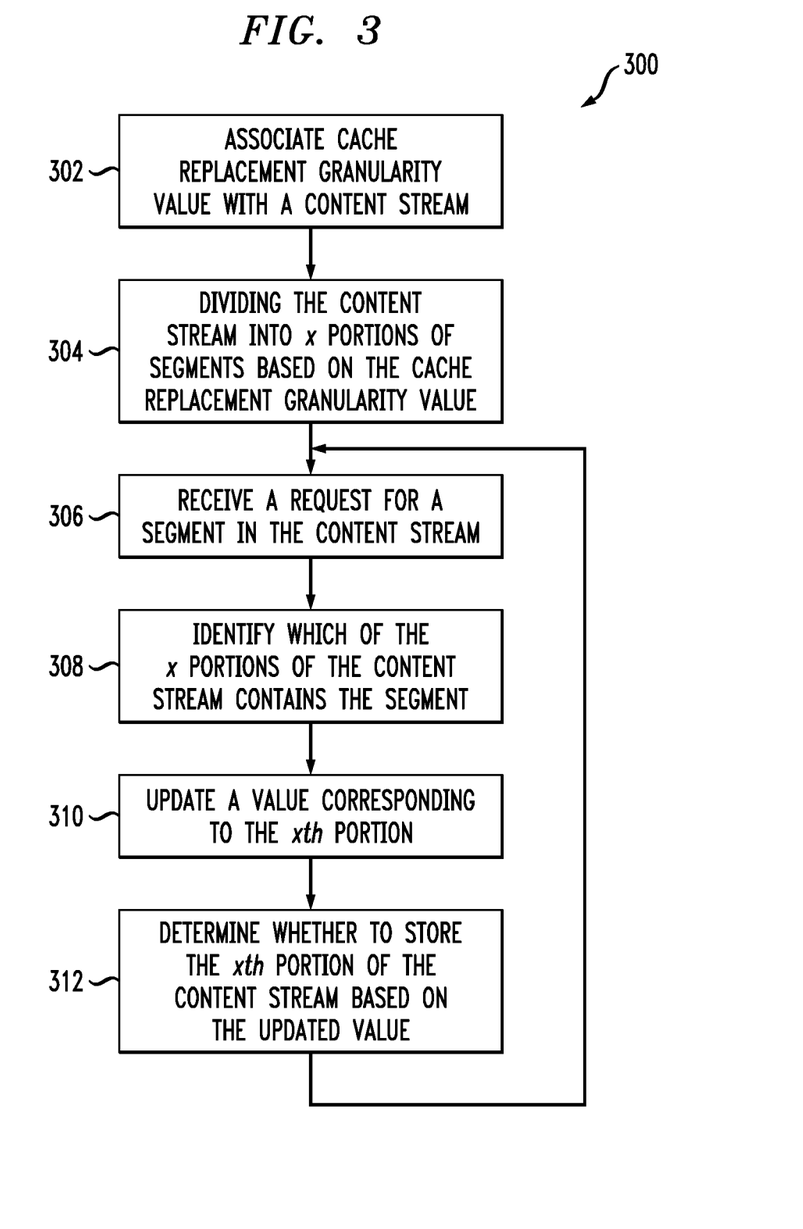
FIG. 3 illustrates a methodology for cache replacement, according to an embodiment of the invention.

As described above, the methodology 200 includes steps of updating a request counter and/or time stamp associated with a group of chunks. FIG. 3 illustrates a methodology 300 for cache replacement which may be used in conjunction with the methodology 200. As shown in FIG. 3, the methodology 300 begins with step 302, where a cache replacement granularity value is associated with a content stream. As described above, a given content stream may be available in a plurality of quality levels. The cache replacement granularity value can be selected in a variety of ways.

For example, the cache replacement granularity value may be based on a total number of segments or chunks in the content stream. As another example, the cache replacement granularity value may be set to an initial value regardless of the total number of segments or chunks in the content stream. The caching proxy 104 or other network element may dynamically adjust the cache replacement granularity value for a given content stream based on request statistics, available cache memory, network characteristics, etc. The cache replacement granularity value may also be selected as some fraction or percentage of the total number of segments or chunks in the content stream. For example, the cache replacement granularity value may be selected such that each content stream is split into 4 equal groups, such that a content stream comprising 100 segments would have a cache replacement granularity value of 25, while a content stream comprising 60 segments would have a cache replacement granularity value of 15. Various other examples are possible, and embodiments of the invention are not limited solely to the examples described above.

A given content stream may be available in a plurality of quality levels. In some embodiments, the cache replacement granularity value may be set for a content stream such that regardless of the quality level of the content stream the cache replacement granularity value is the same. In other embodiments, a cache replacement granularity value may be set for each quality level of the content stream separately. A higher quality content stream will typically have segments which are larger in size and thus require more storage than a lower quality content stream. As such, the cache replacement granularity for a higher quality content stream may be selected such that the total size of a group of segments of the higher quality content stream is the same as the total size of a corresponding group of segments of a lower quality content stream.

Once a cache replacement granularity value is associated with a content stream in step 302, the methodology 300 divides 304 the content stream into x portions of segments based on the cache replacement granularity value. As described above, for a content stream with 200 segments and a cache replacement granularity value of 50, the groups will be [0,50], [51,100], [101,150] and [151,200]. The caching proxy 104 or other network element may maintain a table which maps each segment of the content stream to a particular group. Next, a request is received 306 for a segment in the content stream. The caching proxy 104 or other network element identifies which of the x portions of the content stream contains the segment. The caching proxy 104 or other network element may use the table structure described above to do so.

After identifying the portion of the content stream, the methodology 300 proceeds with updating 310 a value corresponding to the xth portion of the content stream. As shown in FIG. 2, the caching proxy 104 may update a request counter and/or a time stamp associated with the xth portion of the content stream. The methodology 300 concludes with determining 312 whether to store the xth portion of the content stream based at least in part on the updated value.

A variety of techniques may be used to make the determination of step 312. For example, the updated value may be a time stamp. Each time a request is made for a segment, the time stamp associated with the group of the content stream containing the segment may be updated. Thus, cache replacement algorithms such as LRU and LFU may be used to in the determining step 312.

The updated value used for the determination in step 312 may also or alternatively represent a frequency or counter value. Each time a request is made for a segment or chunk in a given portion, the counter value may be updated by a specified value. For example, the counter value may simply be incremented by 1. Alternatively, the counter value may be incremented by 1 divided by the cache replacement granularity value (i.e., the number of segments in the group). This will discount the impact of the cache hit compared to other content streams which either do not comprise a group of chunks or which has a smaller cache replacement granularity value.

The determination 312 may thus be based on a comparison between the counter value associated with a given portion of the content stream and with counter values associated with other portions of content stream and other content streams generally. For example, a determination may be made to cache the given portion when its corresponding frequency or counter value is greater than a specified number of other portions of that content stream and other content streams. The specified number may be a predetermined integer value or may be a specified percentage value. For example, a memory of the network element or caching proxy may be able to store 100 portions of content streams, while the network element or caching proxy may be expected to receive requests for 500 portions of content streams. The specified number could thus be an integer value, such as 400 or a percentage value such as 80%.

The determination 312 could also be made based on a value which represents a size-normalized utility value associated with a portion of the content stream. As described above, content streams may be available in a number of quality levels. When a cache replacement granularity value is selected for a content stream as a whole, a group of segments at a higher quality level will typically have a higher storage cost then a group of segments at a lower quality level. To account for this disparity, the value associated with a given portion of the content stream may be size normalized. The size-normalized utility value technique may similarly be used to account for disparities between two different content streams. For example, a first content stream may be a video stream where each segment is 30 seconds, while a second content stream may be a video stream where each segment is 10 seconds. For corresponding quality levels, groups of the first content stream will typically have a higher storage cost than groups of the second content stream. Updating a size-normalized utility value for each portion of the first and second content stream can account for this disparity. The size-normalized utility value may also be used to account for disparities in the sizes of chunks within a given portion of a content stream or within a given quality level of a content stream.

In some embodiments, the cache replacement granularity is selected for the content stream as a whole as described above, such that a given portion of a higher quality level of the content stream has the same number of segments as that of a lower quality level of the content stream. In such a case, a group of segments may be considered to encompass all quality levels of the content stream. For example, a content stream may be available in five quality levels. If a determination is made in step 312 to cache a given portion of this content stream, all five quality levels of the given portion may be cached. This, however, may result in a significant storage cost for the cache.

The caching proxy 104 or other network element may thus maintain statistics or counter values for each of the quality levels. If the third quality level is the most frequently requested quality level, the determination in step 312 may choose to cache only the third quality level. Alternatively, the determination in step 312 may choose to cache the third quality level, and one quality level above and below the third quality level (second and fourth). This assumes that subsequent requests for this portion of the content stream are most likely to fluctuate by a single quality level in either direction in response to current network characteristics or the status of client requesting segments of the content stream. One skilled in the art will readily appreciate that various other arrangements are possible. For example, the determination in step 312 may choose to store specified number of the most frequently requested quality levels for the given portion of the content stream.

While various techniques have been described above for implementing the determination of step 312 separately or in the alternative, embodiments of the invention are not limited solely to a single one of the techniques described above. Instead, embodiments of the invention may combine two or more of the above techniques. In addition, while some of the techniques above are described with respect to a cache replacement granularity value which is set for a content stream as a whole or with respect to cache replacement granularity values which are set for each quality level of the content stream, embodiments of the invention are not so limited. Instead, these techniques may be readily adapted to both cases. In addition, a given caching proxy or network element may associate a single cache replacement granularity value for some content streams as a whole, while associating quality-level specific cache replacement granularity values for other content streams.

It is important to note that while methodologies 200 and 300 are discussed separately, these methodologies may be combined in one or more embodiments of the invention. In addition, while various steps in methodologies 200 and 300 are described in a sequential order, some of these steps may be performed in a different order or in parallel. By way of example only, steps 202 and 203 in methodology 200 may be performed in parallel or in reverse order. Numerous other examples are possible, as will be appreciated by one skilled in the art.

Figure 4:
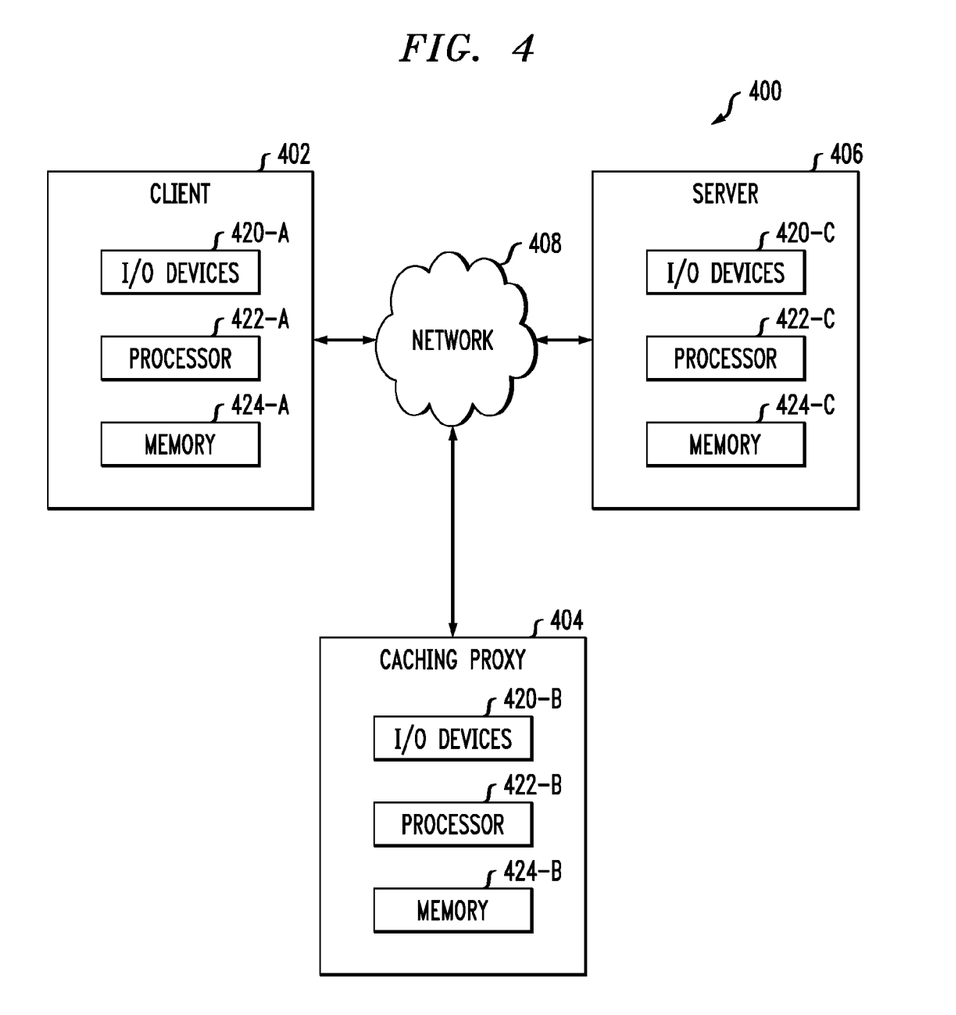
FIG. 4 illustrates a processing architecture used to implement a streaming content system, according to an embodiment of the invention.

FIG. 4 illustrates a processing architecture 400 for devices used to implement a streaming content system and methodology, according to an embodiment of the invention. It is to be understood that although FIG. 4 shows only a single client 402, caching proxy 404 and server 406, embodiments of the invention may include various other arrangements containing a number of each of such devices. Client 402 may be an HAS client, server 406 may be an HAS server, and caching proxy 404 may be a caching proxy or another network element.

As shown, client device 402, caching proxy 404, and server 406 are coupled via a network 408. The network may be any network across which the devices are able to communicate, for example, as in the embodiments described above, the network 406 could include a publicly-accessible wide area communication network such as a cellular communication network and/or the Internet and/or a private intranet. However, embodiments of the invention are not limited to any particular type of network. Note that when the computing device is a content provider, it could be considered a server, and when the computing device is a content consumer, it could be considered a client. Nonetheless, the methodologies of the present invention are not limited to cases where the devices are clients and/or servers, but instead are applicable to any computing (processing) devices.

As would be readily apparent to one of ordinary skill in the art, the computing devices may be implemented as programmed computers operating under control of computer program code. The computer program code would be stored in a computer readable storage medium (e.g., a memory) and the code would be executed by a processor of the computer. Given this disclosure of the invention, one skilled in the art could readily produce appropriate computer program code in order to implement the methodologies described herein.

As shown, client 402 comprises I/O devices 420-A, processor 422-A and memory 424-A. Caching proxy 404 comprises I/O devices 420-B, processor 422-B and memory 424-B. Server 406 comprises I/O devices 420-C, processor 422-C and memory 424-C.

It should be understood that the term "processor" as used herein is intended to include one or more processing devices, including a central processing unit (CPU) or other processing circuitry, including but not limited to one or more video signal processors, one or more integrated circuits, and the like.

Also, the term "memory" as used herein is intended to include memory associated with a video signal processor or CPU, such as RAM, ROM, a fixed memory device (e.g., hard drive), or a removable memory device (e.g., diskette or CDROM). Also, memory is one example of a computer readable storage medium.

In addition, the term "I/O devices" as used herein is intended to include one or more input devices (e.g., keyboard, mouse) for inputting data to the processing unit, as well as one or more output devices (e.g., a display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Advantageously, embodiments of the invention as illustratively described herein allow for efficient caching in a content streaming system. Embodiments of the invention improve caching efficiency using cache replacement granularity values associated with respective content streams.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
    associating at least one cache replacement granularity value with a given one of a plurality of content streams, the given content stream comprising a plurality of segments;
    dividing the given content stream into two or more portions each comprising two or more segments, a number of segments in each of the two or more portions being based at least in part on a value of the at least one cache replacement granularity associated with the given content stream;
    receiving a request for a given segment of the given content stream in a network element;
    identifying a given one of the two or more portions of the given content stream which contains the given segment;
    updating a value corresponding to the given portion of the given content stream; and
    determining whether to store the given portion of the given content stream in a memory of the network element based at least in part on the updated value corresponding to the given portion;
    wherein the updated value is a timestamp.

2. The method of claim 1, wherein:
    each of the plurality of content streams comprises a plurality of segments;
    the associating step further comprises associating at least one cache replacement granularity value with each of the plurality of content streams; and
    the dividing step further comprises dividing each of the plurality of content streams other than the given content stream into two or more portions each comprising two or more segments, a number of segments in each of the two or more portions of each of the plurality of content streams other than the given content stream being based at least in part on a value of the at least one cache replacement granularity value associated with that content stream.

3. The method of claim 2, further comprising maintaining a value corresponding to each of the two or more portions of each of the plurality of content streams.

4. The method of claim 3, wherein the determining step further comprises:
    comparing the updated value corresponding to the given portion of the given content stream to the values corresponding to each of the two or more portions of each of the plurality of content streams; and
    storing the given portion of the given content stream in the memory of the network element when the updated value corresponding to the given portion is greater than a specified number of values corresponding to each of the other portions of the plurality of content streams.

5. The method of claim 4, wherein the specified number is at least one of a predetermined integer value and a predetermined percentage value.

6. The method of claim 1, wherein the updated value further comprises a counter value, and the updating step comprises incrementing the counter value.

7. The method of claim 6, wherein the counter value is incremented by 1.

8. The method of claim 6, wherein the counter value is incremented by 1 divided by a number of segments in the given portion.

9. The method of claim 1, wherein each of the number of segments of the given content stream is available in a plurality of quality levels and dividing the given content stream comprises dividing each of the plurality of quality levels of the given content stream into two or more portions each comprising two or more segments.

10. The method of claim 9, further comprising calculating a size-normalized utility value based at least in part on respective sizes of segments in the given portion.

11. The method of claim 10, wherein the number of segments in the given portion of the given content stream is multiplied by the size-normalized utility value to determine a utility adjustment value, and wherein the updated value further comprises a counter value that is incremented by 1 divided by the utility adjustment value.

12. The method of claim 1, further comprising dynamically adjusting the at least one cache replacement granularity value responsive to the receiving step.

13. The method of claim 1, further comprising mapping respective ones of the one or more segments to respective ones of the one or more portions of the given content stream in a table data structure.

14. The method of claim 1, wherein the given content stream is a Hypertext Transfer Protocol (HTTP) Adaptive Streaming (HAS) content stream and the network element is a caching proxy.

15. The method of claim 14, wherein the HAS content stream comprises a video stream.

16. A network element, comprising:
    a memory; and
    a processor coupled to the memory and operative to:
        associate at least one cache replacement granularity value with a given one of a plurality of content streams, the given content stream comprising a plurality of segments;
        divide the given content stream into two or more portions each comprising two or more segments, a number of segments in each of the two or more portions being based at least in part on a value of the at least one cache replacement granularity associated with the given content stream;

receive a request for a given segment of the given content stream from a given one of a plurality of clients;

identify a given one of the two or more portions of the given content stream which contains the given segment;

update a value corresponding to the given portion of the given content stream; and determine whether to store the given portion of the given content stream in the memory based at least in part on the updated value corresponding to the given portion;

wherein the updated value is a timestamp.

17. The network element of claim 13, wherein the given one of the plurality of clients is a Hypertext Transfer Protocol (HTTP) Adaptive Streaming (HAS) client, the network element is a caching proxy, and the given content stream is a HAS content stream.

18. A system, comprising:
a plurality of clients;
at least one server; and
at least one network element, the at least one network element comprising a memory and being configured to:
associate at least one cache replacement granularity value with a given one of a plurality of content streams, the given content stream comprising a plurality of segments;
divide the given content stream into two or more portions each comprising two or more segments, a number of segments in each of the two or more portions being based at least in part on a value of the at least one cache replacement granularity associated with the given content stream;

receive a request for a given segment of the given content stream from a given one of the plurality of clients;

identify a given one of the two or more portions of the given content stream which contains the given segment;

update a value corresponding to the given portion of the given content stream;

determine whether to store the given portion of the given content stream in the memory based at least in part on the updated value corresponding to the given portion; and retrieve the given portion of the given content stream from the at least one server;

wherein the updated value is a timestamp.

19. The system of claim 18, wherein the given one of the plurality of clients is a Hypertext Transfer Protocol (HTTP) Adaptive Streaming (HAS) client, the server is an HAS server the given content stream is a HAS content stream.

* * * * *